(12) United States Patent
Shiue

(10) Patent No.: US 8,580,074 B2
(45) Date of Patent: Nov. 12, 2013

(54) SEAM CONSTRUCTION METHOD OF FLEXIBLE APPAREL

(75) Inventor: Min-Chen Shiue, Wujie Township, Yilan County (TW)

(73) Assignee: Shei Chung Hsin Ind. Co., Ltd., Wujie (TW)

( * ) Notice: Subject to any disclaimer, the term of this patent is extended or adjusted under 35 U.S.C. 154(b) by 245 days.

(21) Appl. No.: 13/101,255

(22) Filed: May 5, 2011

(65) Prior Publication Data

US 2012/0278965 A1 Nov. 8, 2012

(51) Int. Cl.
*C09J 4/00* (2006.01)
*C09J 101/00* (2006.01)
*C09J 201/00* (2006.01)
*A41D 5/00* (2006.01)

(52) U.S. Cl.
USPC .............................................. 156/331.7; 2/67

(58) Field of Classification Search
USPC .............................................. 2/67; 156/331.7
See application file for complete search history.

(56) References Cited

U.S. PATENT DOCUMENTS

| 2004/0009324 | A1* | 1/2004 | Wu ............................... 428/102 |
| 2006/0270770 | A1* | 11/2006 | Feng et al. ..................... 524/268 |
| 2007/0000002 | A1 | 1/2007 | Shiue |

FOREIGN PATENT DOCUMENTS

WO 00/20197 4/2000

* cited by examiner

*Primary Examiner* — Michael Orlando

(57) ABSTRACT

A flexible apparel with non-stitch seams and a fabrication method thereof is provided. The non-stitch seams between foamed rubber sheets are sealed by coating a liquid sealant solution containing a thermoplastic polyurethane and a plasticizer.

8 Claims, 1 Drawing Sheet

SEAM CONSTRUCTION METHOD OF FLEXIBLE APPAREL

BACKGROUND

1. Technical Field

The disclosure relates to flexible apparel. More particularly, the disclosure relates to constructing non-stitching seams on flexible apparel used for water sports.

2. Description of Related Art

Flexible apparel is commonly used in water sports, such as diving, surfing and canoeing. The flexible apparel that is used in water sports must have the characteristics of lightweight, elasticity, buoyancy, being easy to put on and take off and comfortable touch of skin contact in order to allow the wearer to keep warm and to move freely without substantial constraints. The most commonly used material is foamed rubber.

Flexible apparel is made by joining separate foamed rubber sheets together. The joint is formed by adhesive bonding with optional sewing. The sewing operation causes waterproof deficiency in long-term use of the flexible apparel, as well as irritation to the wearer's skin by repeated scratching.

Therefore, some flexible apparel manufacturers have developed the process of using a sealant, tape, or liquid glue, to cover or replace the surface of the stitched foamed rubber sheet in order to overcome the defects caused by pinholes or sewing threads. But the sealant increases the thickness of the seam (glue plus threads plus sealant), and that impacts the aesthetic appearance. Moreover the sealant does not have high elasticity and thus decreases the stretchability of rubber foam sheet.

SUMMARY

In one aspect, the present invention is directed to flexible apparel with non-stitching seams. The flexible apparel comprises at least two foamed rubber sheets in butt splice manner to form a non-stitch seam therebetween, and at least a flexible seal covering the non-stitch seam to seal the two foamed rubber sheets. The formulation of the flexible seal is free of lubricant and comprises 100 parts by weight of a thermoplastic polyurethane, and 57.3-115 parts by weight of a plasticizer.

In another aspect, the present invention is directed to a method of fabricating flexible apparel. First, a liquid sealant solution having a viscosity of 250,000-480,000 cps is prepared. The formulation of the liquid sealant is free of lubricant and comprises 100 parts by weight of thermoplastic polyurethane, 57.3-115 parts by weight of plasticizer, and solvents. Next, the liquid sealant solution is coated onto a non-stitch seam between two foamed rubber sheets. Then, the liquid sealant solution is placed at room temperature to air-dry the flexible seal. This method of fabrication consumes lower amounts of energy than other prevalent methods in the industry.

The foregoing description presents a simplified summary of the disclosure in order to provide a basic understanding to the reader. This summary is not an extensive overview of the disclosure and it does not identify key/critical elements of the present invention or delineate the scope of the present invention. Its sole purpose is to present some concepts disclosed herein in a simplified form as a prelude to the more detailed description that is presented later.

Many of the attendant features will be more readily appreciated as the same becomes better understood by reference to the following detailed description considered in connection with the accompanying drawings.

DETAILED DESCRIPTION

Figure 1A:
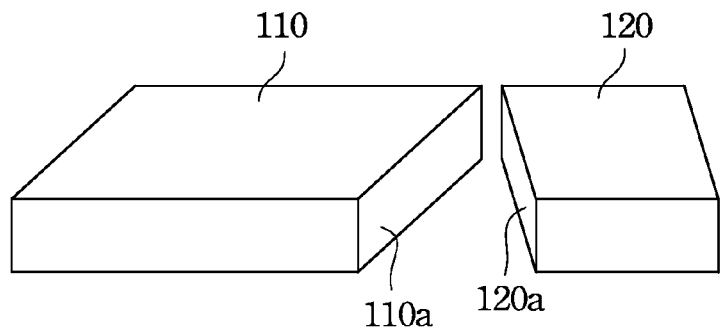
FIGS. 1A-1C are process diagrams of joining two foamed rubber sheets and forming a flexible seal on the seam.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

Preparation of Liquid Sealant Solution

In one aspect, this invention provides a formulation of a liquid sealant solution for sealing two foamed rubber sheets without stitching to fabricate flexible apparel.

The formulation above comprises 100 parts by weight of thermoplastic polyurethane, 57.3-115 parts by weight of a plasticizer, and a suitable amount of solvents. The viscosity of the obtained liquid sealant solution is 250,000-480,000 cps for better performance of the following coating process. Moreover, this formulation does not contain any lubricant. The plasticizer above needs to be compatible with the thermoplastic polyurethane to decrease the hardness of the final product and increase the elasticity of the final product. The plasticizer can be an ester-type plasticizer, such as dipropylene glycol dibenzoate or equivalents, for example.

The solvent above needs to meet several requirements: being capable of dissolving the thermoplastic polyurethane, and with moderate volatility. N,N-dimethyl formamide (DMF) is usually used to dissolve the thermoplastic polyurethane, but its cost is higher. Toluene can also be used to dissolve the polyurethane, and its cost is lower, although the solubility of the polyurethane in toluene is usually lower than in DMF. Therefore, the liquid sealant solution with DMF can have moderate flow ability, and can be stored for a longer period. Methyl ethyl ketone (MEK) is usually added to lower the boiling point of the liquid sealant solution, and thus the drying rate of the liquid sealant solution can be increased to shorten the drying time. Because each solvent has its unique advantages, the solvent above is usually a mixed solvent system. For example, the solvent can be a combination of methyl ethyl ketone, N,N-dimethyl formamide, and toluene in a specific weight ratio.

In some examples, the coating seal formulation can further comprise 3-26 parts by weight of a pigment to obtain a desired color, such as black, grey, or red color, for the final product.

Sealing Method for Fabricating Flexible Apparel with Non-Stitch Seams

Figure 1B:
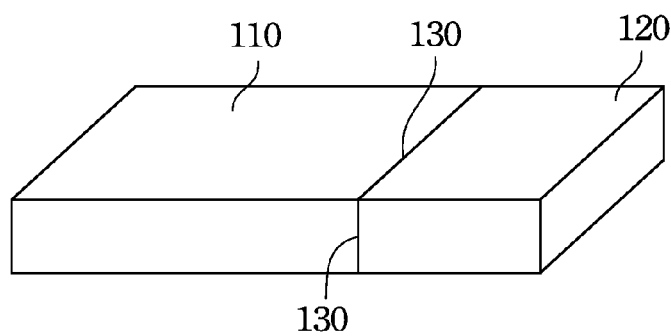
Figure 1C:
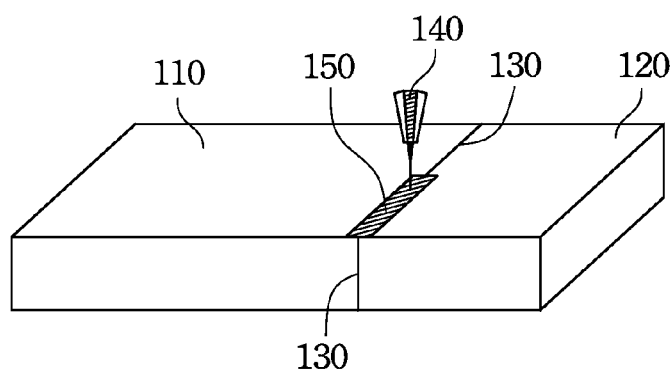

In another aspect, this invention provides a joining method for fabricating flexible apparel with non-stitch seams. FIGS. 1A-1C are process diagrams of sealing two foamed rubber sheets and forming a flexible seal on the seam.

In FIGS. 1A-1B, a first joining surface 110a of a first foamed rubber sheet 110 and a second joining surface 120a of a second foamed rubber sheet 120 are put close together in butt splice manner to form a seam 130 between the first foamed rubber sheet 110 and the second foamed rubber sheet 120. Each of the foamed rubber sheets 110 and 120 can be a foamed rubber layer alone, a foamed rubber layer laminated with one fabric layer, or a foamed rubber layer sandwiched by two fabric layers.

Next in FIG. 1C, the liquid sealant solution 140 prepared above is applied onto the seam 130 to form a flexible seal 150. Since the liquid sealant solution 140 can well penetrate into the seam 130, the flexible seal 150 is not only formed on the surface of the seam 130 but also inside the seam 130 between the first foamed rubber sheet 110 and the second foamed rubber sheet 120. To provide sufficient bonding strength to seal two foamed rubber sheets, the coating width of the liquid sealant solution is better to be at least 3 mm, such as 3-15 mm, and the coating thickness is better to be at least 0.4 mm, such as 0.4-1.2 mm. Except the consideration above, there is no specific limitation for the coating width and thickness of the liquid sealant solution. The coating width and thickness of the liquid sealant solution are determined by the requirements of the flexible apparel.

Next, the sealed structure is placed at room temperature, without heating, to air-dry the flexible seal 150. The relative humidity of the ambient environment is better to be lower than 60% to prevent the flexible seal 150 from absorbing water vapor during the drying and aging period. The flexible seal 150 can be formed on an outer surface or/and an inner surface of a flexible apparel.

The obtained flexible seal 150 should meet the following standards to produce final products suitable for the water sports market. The test results of ASTM D412 include that the elongation of the obtained flexible seal 150 should be greater than 600%, the tensile strength needs to be greater than 36 $Kg/cm^2$, and the 60% modulus should be less than 11 $Kg/cm^2$. The test results of ASTM D2240 include that the hardness of the obtained flexible seal 150 should be 30°±5°.

Since the flexible seal 150 is formed inside and on the seam 130, the flexible seal 150 can provide both high waterproof and high bonding strength (>22.7 $Kg/cm^2$). Moreover, since the thermoplastic polyurethane can be dried and aged at room temperature, the production cost can be lowered and energy can be conserved. Some experimental examples are disclosed below.

Comparative Tests

Some comparative tests for various reinforced processes for the seam between two foamed rubber sheets were performed.

The foamed rubber sheets having a foamed rubber sheet sandwiched by two nylon fabric layers were used in this comparative test. The thickness of the foamed rubber sheets was 3 mm. When the foamed rubber sheets were stretched to increase its length by 60%, the needed external force was 1.3 kg. When an external force of 4.5 Kg was applied to the foamed rubber sheets, the length of the foamed rubber sheets was increased to by 175.0%.

Figure 2:
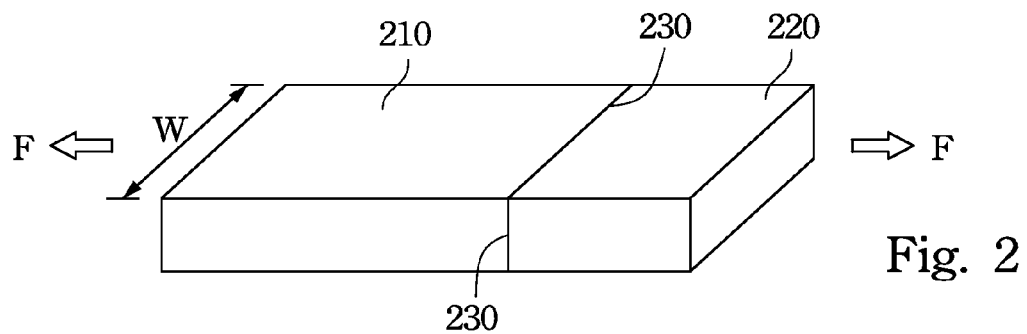
FIG. 2 is a diagram of a formed flexible seal on a seam between two foamed rubber sheets and the directions of applied external forces in parallel bonding strength test.

FIG. 2 is a diagram of a formed flexible seal on a seam between two foamed rubber sheets and the directions of applied external forces F in parallel bonding strength test. In FIG. 2, two foamed rubber sheets 210 and 220, having a width (W) of 4 inches, were butt-spliced in a non-laminated manner and the joining surfaces of the foamed rubber sheets were glued by an adhesive to form a glued seam 230 therebetween. The additional processes for bonding the two foamed rubber sheets together were listed in Table 1 for Examples 1-4, respectively.

In Example 1, no additional processes were performed on both surfaces of the seam between the two foamed rubber sheets, and the parallel bonding strength was only 16.4 $kg/cm^2$, which is lower than 22.7 $kg/cm^2$ of the accepted parallel bonding strength for the wetsuits.

In Example 2, only one surface of the seam was stitched, the other surface is not processed further. Comparing with Example 1, the parallel bonding strength was raised to 32.1 $kg/cm^2$, which was about two times that of Example 1.

In Example 3, one surface of the seam was further stitched, and the other surface of the seam was further reinforced by hot melt glue. Comparing with Example 2, the parallel bonding strength was further raised to 38.6 $kg/cm^2$.

In Example 4, both surfaces of the non-stitch seam was further reinforced by coating a liquid sealant solution, the coating width was 4 mm on the first surface and 6 mm on the second surface. The liquid sealant solution used here includes 100 parts by weight of thermoplastic polyurethane, 86.6 parts by weight of dipropylene glycol dibenzoate, and 195 parts by weight of a mixed solvent (MEK, DMF, and toluene in a weight ratio of 1:2.4:3.6). The parallel bonding strength was 34.5 $kg/cm^2$, which was between those of Example 2 and Example 3.

For the stretching test results, the elongation of Example 4 is quite close to that of the foamed rubber sheet itself, and hence it can provide a relatively comfortable feeling to the wearers. The coating seal provides the most similar stretching performance to that of the foamed rubber sheet itself out of the 4 processing methods tested.

TABLE 1

Comparative tests for various reinforced processes for the seam between two foamed rubber sheets

| | Additional process | | Stretching Test | | 4" parallel |
|---|---|---|---|---|---|
| Examples | First surface | Second surface | Modulus 60% (kg) | Elongation at specified load (%4.5 kg) | Bonding Strength $(kg/cm^2)$ |
| 1 | — | — | 1.7 | 178.5% | 16.4 |
| 2 | stitched | — | 2.4 | 148.3% | 32.1 |
| 3 | stitched | Hot melt glue* | 2.8 | 124.6% | 38.6 |
| 4 | Coating seal (4 mm) | Coating seal (6 mm) | 1.9 | 162.7% | 34.5 |
| foamed rubber sheet | — | — | 1.3 | 175.0% | — |

*The structure of the hot melt glue was a layer of cloth and a layer of hot melt glue thereon. The material of the cloth is usually nylon, polyester or polyurethane.

According to the disclosure above, this invention provides the liquid sealant solution and a sealing method for fabricating flexible apparel with non-stitch seams. Thermoplastic polyurethane and a plasticizer are the major components in the liquid sealant solution. Then the liquid sealant solution can be dried and aged at room temperature, without heating, to obtain the final product, i.e. the flexible seal. The obtained flexible seal can be colored by adding a pigment and have smooth tactile quality, without adding any lubricant in the liquid sealant solution. Moreover, since the major component is the thermoplastic polyurethane, the flexible seal can be easily repaired or reworked.

The reader's attention is directed to all papers and documents which are filed concurrently with this specification and which are open to public inspection with this specification, and the contents of all such papers and documents are incorporated herein by reference.

References in the singular may also include the plural (for example, "a" and "an" may refer to one, or one or more) unless the context specifically states otherwise. The use of numerical values in the various ranges specified in this application, unless expressly indicated otherwise, are stated as approximations as though the minimum and maximum values within the stated ranges were both preceded by the word "about". In this manner, some variations above and below the stated ranges can be used to achieve substantially the same results as values within the ranges. Also, the disclosure of these ranges is intended as a continuous range including every value between the minimum and maximum values.

All the features disclosed in this specification (including any accompanying claims, abstract, and drawings) may be replaced by alternative features serving the same, equivalent or similar purpose, unless expressly stated otherwise. Thus, each feature disclosed is one example only of a generic series of equivalent or similar features.

What is claimed is:

1. A method of fabricating a flexible apparel comprising two foamed rubber sheets, consisting of the steps of:
   A. preparing a liquid sealant solution having a viscosity of 250,000-480,000 cps, wherein the formulation of the liquid sealant solution is free of lubricant and consisting of:
   100 parts by weight of thermoplastic polyurethane;
   57.3-115 parts by weight of a plasticizer; and
   a solvent;
   B. coating the liquid sealant solution simultaneously on and inside a non-stitch seam between two foamed rubber sheets; and
   C. placing at room temperature and without heating to dry and age the liquid sealant solution to form a flexible seal on and inside said seam between said two foamed rubber sheets to seal said two foamed rubber sheets to form said flexible apparel.

2. The method of claim 1, wherein the plasticizer is an ester-type plasticizer.

3. The method of claim 1, wherein the plasticizer comprises dipropylene glycol dibenzoate.

4. The method of claim 1, wherein the solvent is a mixed solvent of methyl ethyl ketone, N, N-dimethyl formamide, and toluene.

5. The method of claim 1, wherein the foamed rubber sheets each is a foamed rubber layer alone, or a foamed rubber layer laminated with one or two fabric layers.

6. The method of claim 1, wherein the width of the flexible seal is 3-15 mm.

7. The method of claim 1, wherein the thickness of the flexible seal is 0.4-1.2 mm.

8. The method of fabricating flexible apparel of claim 1, wherein said flexible seal as formed is colored by adding pigment therein.

* * * * *